July 11, 1944. W. EDLICH 2,353,448
VARIABLE SPEED POWER TRANSMISSION
Filed March 4, 1943 2 Sheets-Sheet 1
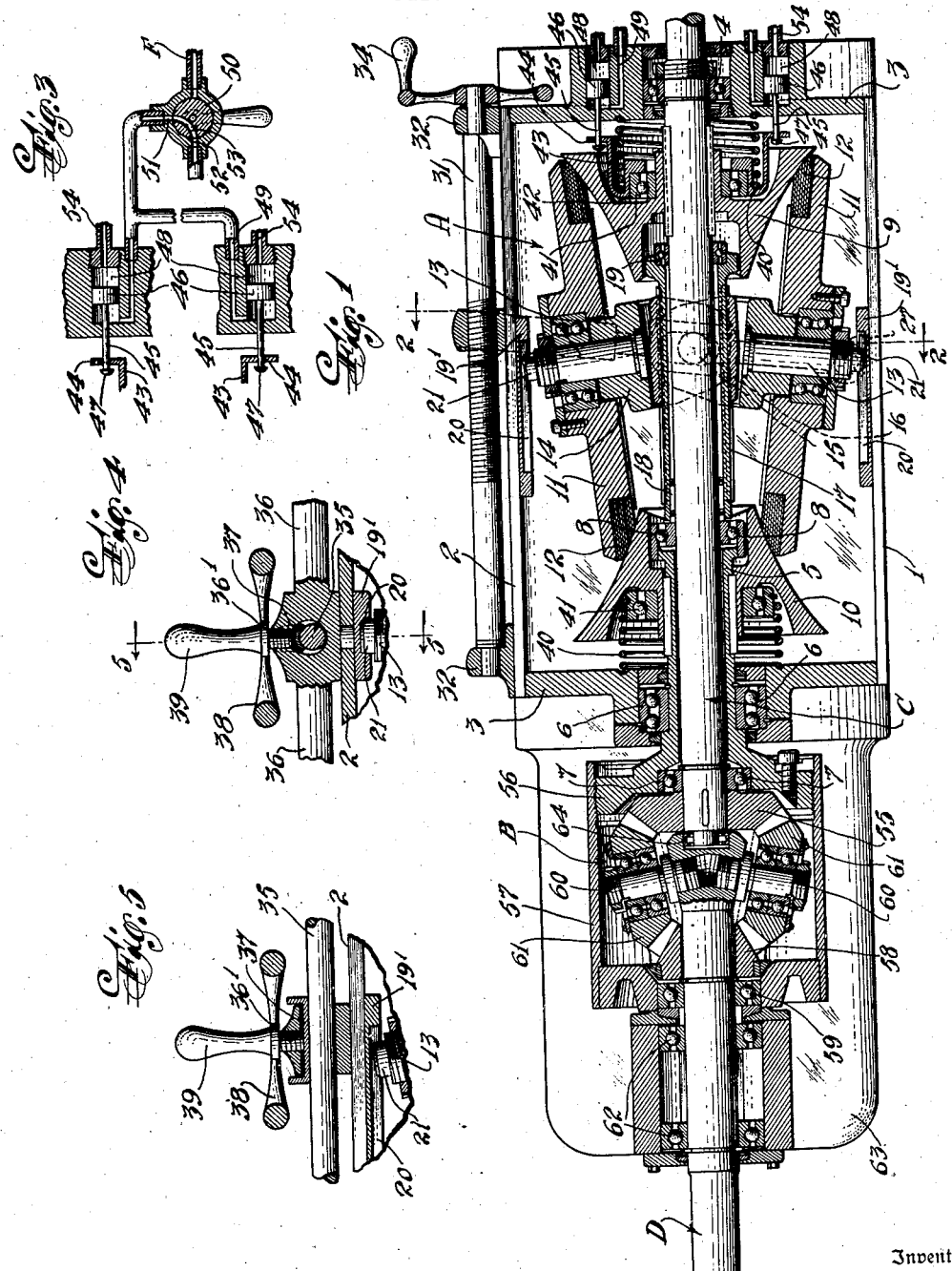
Inventor
William Edlich,
By Harry B. Rook,
Attorney

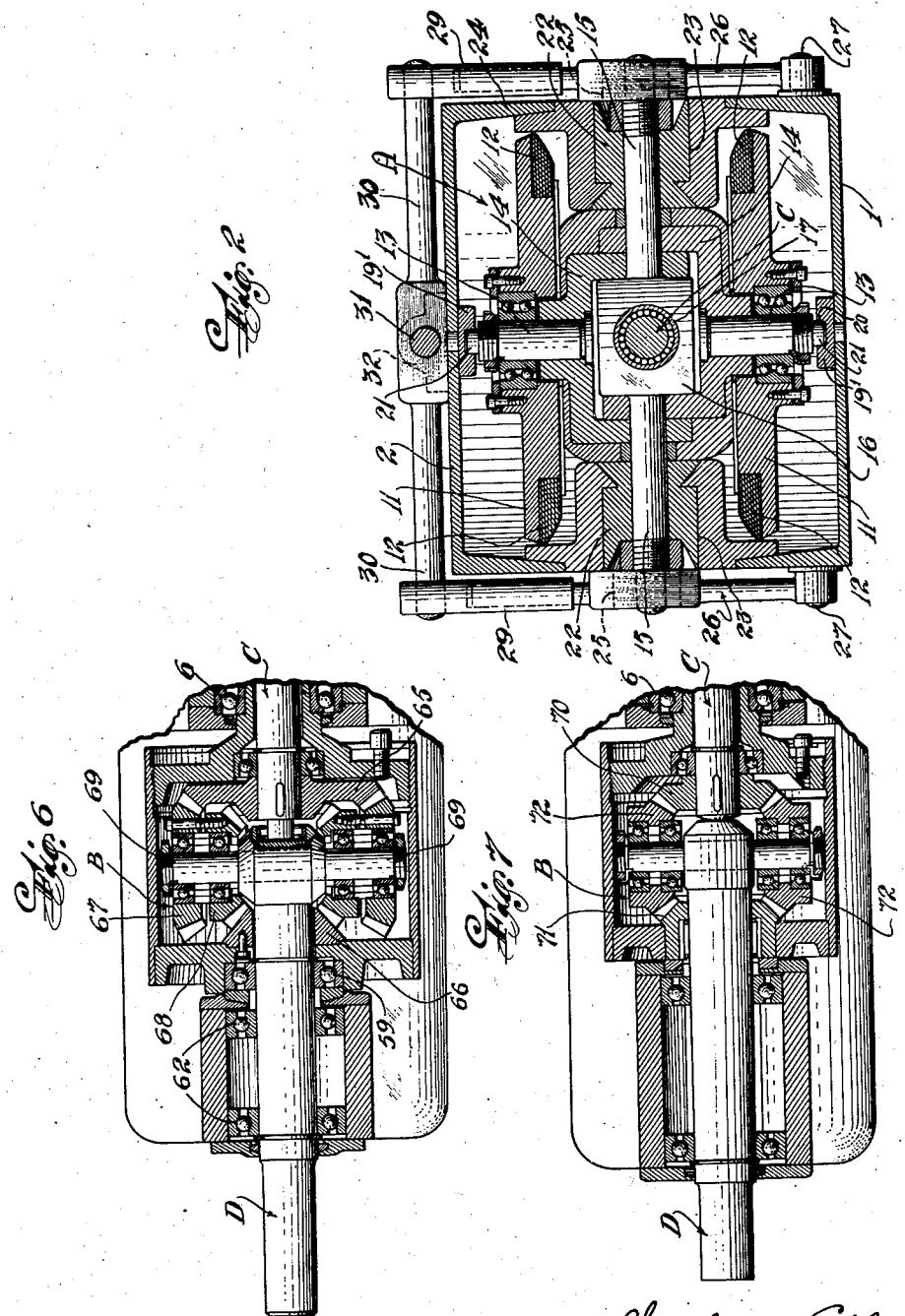

Patented July 11, 1944

2,353,448

UNITED STATES PATENT OFFICE 2,353,448

VARIABLE-SPEED POWER TRANSMISSION

William Edlich, Dover, N. J.

Application March 4, 1943, Serial No. 477,905

7 Claims. (Cl. 74—285)

This invention relates in general to variable speed transmission mechanisms that can be used for numerous purposes, for example for automotive devices such as automobiles, tractors, military armored tanks, where a change in speed of a driven unit relative to the engine or motor is required; or for industrial devices such as lathes, drill presses, boring mills and similar machines, where speed control is desirable for different classes of work.

My invention especially contemplates mechanism of this general character which shall embody a pair of coaxially revoluble friction wheels whose peripheral surfaces are curved according to the tractrix or anti-friction curve, and transmission discs which are journaled on spindles whose axes are angularly related to one plane and tiltable in another plane of the axis of said friction wheels and which have friction surfaces to contact with the peripheral surfaces of said friction wheels such that relative shifting of said friction wheels and transmission discs will shift the zones of contact thereof and vary the relative speeds of rotation of said friction wheels.

In United States Patent No. 1,856,383, dated May 3, 1932, is disclosed such a mechanism wherein the shifting of the zones of contact of said wheels and discs is effected by bodily axial movement of the friction wheels relative to the transmission discs.

A prime object of my invention is to provide novel and improved construction, combination and arrangement of the friction wheels and transmission disks which shall include a new and better mounting for the transmission disks such that they can be adjusted relative to the friction wheels instead of the friction wheels being mounted for bodily axial adjustment relative to the transmission disks, whereby the gearing shall be compact and simple and trouble from misaligned bearings, excessive internal friction and unbalanced strains shall be obviated.

Further objects are to provide such variable speed gearing which shall include a novel and improved mounting for the transmission disks wherein the mounting, and particularly the axis of tilting of said disks shall be movable lengthwise of the axis of rotation of said friction wheels so that said spindles of the transmission disks can tilt and thus shift the zones of contact of said disks with said friction wheels; and to provide novel and improved compact, simple and reliable means for actuating said mounting of the transmission disks so as to vary the relative speeds of rotation of said friction wheels.

Another object is to provide a novel and improved combination of a variable speed friction gearing of the character described and differential bevel gearing whereby heavy loads or high power may be transmitted and high speeds may be attained at high efficiency with mechanism of small size and of simple construction.

Another object is to provide a novel and improved combination of variable speed friction gearing and differential bevel gearing wherein the driven shaft is in axial alignment with the driving shaft and in which said bevel gearing shall include a relatively large bevel gear directly connected to the driving or prime mover shaft and differential bevel gears directly connected to the driven shaft, and the variable speed friction gearing shall be driven from said driving shaft but primarily shall cooperate with said bevel gearing to vary the speed of said driven shaft, so that the main load and torque shall be carried by said bevel gearing and a minimum of load strain and torque shall be imposed upon said variable speed gearing.

Other objects are to provide a novel and improved means for relieving contact between the driving friction wheel and the transmission disks, to ensure instantaneous stopping of the mechanism when desirable or to hold the mechanism in neutral; and to obtain other advantages and results which will be brought out by the following description, in conjunction with the drawings, in which Figure 1 is a vertical longitudinal sectional view through a variable speed power transmission mechanism embodying my invention.

Figure 2 is a transverse vertical sectional view on the line 2—2 of Figure 1.

Figure 3 is a fragmentary schematic view of the mechanism for releasing the friction driving wheel from the transmission disc.

Figure 4 is a fragmentary transverse vertical sectional view similar to Figure 2 showing a modification of the mechanism for adjusting the transmission discs relative to the friction wheels.

Figure 5 is a vertical sectional view on the line 5—5 of Figure 4, and

Figures 6 and 7 are vertical longitudinal sectional views of other forms of differential bevel gearing.

Specifically describing the embodiment of the invention illustrated in Figures 1 to 3 inclusive, the reference character A designates generally a variable speed friction gearing and B designates differential bevel gearing, which are associated with each other to transmit power and rotary motion at different speeds from a drive shaft C to a driven shaft D.

The variable speed friction gearing includes a frame, casing or support which comprises a bottom wall 1, a top wall 2, and end walls 3. The main driving shaft C is journaled by a bearing 4 in one of the end walls 3 of the frame and has a tubular secondary shaft 5 telescopically associated with its other end and journaled in a bearing 6 in the other end wall 3 of the frame. As shown, the secondary shaft 5 has bearings 7 and 8 between its inner and outer ends respectively and the main drive shaft C, so that said shafts may rotate relatively to each other.

A friction wheel 9 is keyed upon the main driving shaft C to rotate therewith, and a similar friction wheel 10 is keyed upon the secondary shaft 5 to rotate therewith. These friction wheels are spaced apart longitudinally of the main drive shaft and cooperate with transmission discs 11. The periphery of each friction wheel is in the form of a curve and increases in diameter in the direction longitudinal of the axis of the shaft from the inner to the outer end of the wheel and preferably conforms to the well known tractrix or anti-friction curve; and the transmission discs have circumferential friction surfaces 12 to frictionally contact with the peripheries of the friction wheels.

Each of the friction discs 11 is rotatably mounted on a spindle 13 that is angularly related to one plane and tiltable in another plane of the axis of the main driving shaft C. More particularly, each spindle is carried by a U-shaped bracket 14 which straddles the driving shaft C and has its arms pivotally connected to diametrically opposite trunnions 15 on a mounting block 16 which is telescopically slidable on and longitudinally of the main drive shaft C. The spindles 13 are thus diametrically opposite each other and are tiltable about the axis of the trunnions 15 which is transverse of the axis or perpendicular to an axial plane of the main drive shaft C and preferably lies in an axial plane of that shaft.

As shown, the mounting block 16 is directly slidably mounted on a sleeve 17 which is telescopically associated with the shaft C and mounted on roller and ball bearings 18 and 19 respectively.

With this construction it will be observed that the mounting block 16 may be moved longitudinally of the shaft C so as to cause the spindles 13 to tilt and vary the positions of the points of contact of the friction surfaces 12 of the transmission discs with the peripheral friction surfaces of the friction wheels 9 and 10. The mounting block 16 is non-rotatable and the spindles 13 are held against tilting in a direction circumferentially of the shaft C by guide blocks 19' in the top and bottom walls 1 and 2 of the frame, which have guide grooves 20 in which the reduced ends 21 of the spindles may slide lengthwise of the shaft C.

With this construction it will be observed that by adjusting the transmission discs 11 relatively to the friction wheels the speed of rotation of the driven friction wheel 10 may be varied.

Various means may be utilized for moving the mounting block 16 but I have shown the trunnions 15 of the mounting block secured in slide bearing blocks 22 which are slidable in guide grooves 23 that are located in the side walls 24 of the frame and are parallel to the shaft C. The extremities of the trunnions 15 project beyond the guide blocks and have lost-motion or pin and slot connections 25 with the respective levers 26 each of which is pivotally mounted at one end at 27 on the frame. Each of the levers is shown in two telescopically associated sections 28 and 29 the uppermost ends of which are connected by a cross bar 30 transversely through which is screw-threaded an adjusting rod 31 which is rotatable in bearings 32 on the top wall of the frame. A suitable handle 34 is provided for rotating the rod 31 and it will be understood that by rotation of said rod the levers 26 may be oscillated or swung about their pivots 27 so as to move the mounting blocks 16 longitudinally of the shaft C.

A modification of this adjusting mechanism is shown in Figures 4 and 5 where the rod 35 corresponding to the rod 31 is stationary and the cross rod 36 corresponding to the cross rod 30 loosely slides along the rod 35. A clamp is provided for clamping the cross rod 30 in adjusted position, said clamp comprising a screw 36' in the cross rod which bears against a shoe 37 that contacts with the rod 35. The screw has a hand wheel or the like 38 for rotating it and a handle 39 is provided for sliding the cross rod 30 along the anchor rod 35.

It is desirable that the friction wheels 9 and 10 shall have limited movement axially of the shaft C so that they may yield under the pressure exerted by the transmission discs 11, and accordingly the wheel 9 is slidable on the shaft C while the wheel 10 is slidable upon the secondary shaft 5. A compression spring 40 is interposed between each of the friction wheels and the corresponding end wall 3 of the frame so as to normally press the friction wheel into contact with the transmission discs. Preferably each friction wheel carries a ball bearing 41 with the outer section of which one end of the corresponding spring 40 is connected so that the friction wheels may rotate relatively to the corresponding springs.

Sometimes it is necessary to stop the transmission discs instantaneously, and it is desirable to accurately hold the mechanism in its neutral position. For this purpose, I have provided means for releasing one of the friction wheels, particularly the driving friction wheel which is connected to the shaft C, from contact with the transmission disc. As shown a thimble 42 is interposed between the ball bearing 41 and the spring 40 of the friction wheel 9, and said thimble has diametrically opposite arms 43 each of which has an opening 44 through which the piston rod 45 of a piston 46 is loosely slidable. The outer end of the piston rod has a head 47 to contact with the arm 43 so that as the piston is moved in one direction, namely to the right in Figure 1, it will exert tension on the thimble 42 so as to compress the spring 40 and release the friction wheel 9 from contact with the transmission discs.

The piston may be operated in this direction in any suitable manner as by fluid pressure. For example each piston is mounted in a cylinder 48 in the corresponding end wall 3 of the frame and each cylinder has an oil inlet duct 49 through which flow of fluid under pressure from a supply pipe F is controlled by a valve 50. Normally the cylinders 48 will be vented in a suitable way as shown in Figure 3 through the two ports 51 and 52 of the valve casing and the duct 53 of the plug of the valve 50. When it is desired to actuate the pistons, the valve plug is rotated to cause communication of the duct 53 with the supply pipe F and the port 51. The cylinders at the other side of the pistons are vented through ports 54.

The variable speed friction gearing A is not capable of transmitting heavy loads or high power, and in accordance with the invention the differential gearing B is associated with the friction gearing for the transmission of high power at high speeds and high efficiency, the friction gearing A serving primarily to vary the speed of the driven shaft.

The differential bevel gearing B includes a driving bevel gear 55 mounted on and rotatable with the main driving shaft C. The secondary shaft 5 of the friction gearing has a flange 56 to which is connected a cylindrical housing 57 which carries a gear 58 so that said housing and said gear 58 are rotatable by and with the secondary shaft 5. Preferably a bearing 59 is interposed between the housing 57 and the driven shaft D.

One end of the driven shaft D projects into the housing through the control gear 58 and has a pair of spindles 60 projecting laterally therefrom; and upon each spindle is rotatably mounted a differential bevel gear 61 which meshes with both the driving bevel gear 55 and the control bevel gear 58. As shown the driven shaft D is mounted in bearings 62 that are carried in an extension 63 of the main frame of the mechanism, and desirably the inner end of the driven shaft is journaled on the juxtaposed end of the main driving shaft C through a bearing 64.

The various bevel gears may be of different relative sizes, depending upon the purpose for which the gear is to be used. As shown in Figure 1 the driving gear 55 is larger than the control gear 58, the ratio being three to two, so that there will be a speed reduction from the main drive shaft C through the bevel gearing to the driven shaft D.

In the operation of the mechanism it will be observed that the gear 55 is a constant speed gear the speed of revolution of which depends upon the speed of rotation of the drive shaft C which may be connected to any prime mover such as a Diesel engine or an electric motor. When it is desired to vary the speed of the driven shaft D the transmission discs will be adjusted by manipulation of the handles 34 or 39 so as to vary the speed of the secondary shaft 5. This in turn will vary the speed of the control gear 58 of the differential bevel gearing B, and power and motion will be transmitted through the differential or planetary gears 61 directly from the driving gear 55 on the main driving shaft 5. The speed of the driven shaft D will depend upon the speed of rotation of the control gear 58. The faster the gear 58 rotates the slower will be the rotation of the planetary gears 61 and the driven shaft D until the latter becomes still and finally rotates in the reverse direction.

It will thus be observed that the main load, torque and strains are carried by the bevel gearing B, while the friction gearing A primarily controls the speed of the control gear 58 and consequently the speed of rotation of the driven shaft D.

The variable speed friction gearing A with the transmission discs adjustable rather than the friction wheels, is compact and simple, and all trouble and complications that might arise from adjustment of the friction wheels longitudinally of the drive shaft relative to the transmission discs is obviated. The differential gearing B is compact and sturdy and consequently the combination of the friction gearing A and bevel gearing B permits the transmission of heavy loads and high power at high efficiency with a minimum of internal friction, without unbalanced strains and with little or no possibility of jamming of the parts.

Figure 6 shows a modification of the bevel gearing which is substantially the same as that shown in Figure 1 with the exception that the ratio of the driving bevel gear 65 to the control gear 66 is two to one, and two bevel pinions 67 and 68 are connected together and rotatably mounted on each of the spindles 69 which project laterally from the driven shaft D. One of the pinions meshes with the driving gear 65 while the other pinion meshes with the control gear 66 so that there will be a speed reduction from the drive shaft C through the bevel gearing to the driven shaft D in the ratio of two to one.

In Figure 7 the bevel gearing is the same as that shown in Figure 1 except that the driving bevel gear 70 and the control gear 71 are of the same diameter. Accordingly the ratio is one to one in the transmission of power from the drive shaft C through the drive gear 70, the planetary gear 72 and the control gear 71 to the driven shaft D.

It will be evident that the driven shaft D will be rotated only when the driving bevel gear, e. g., gear 55, and the control gear, e. g. gear 58, rotate at different speeds. Consequently the speed of rotation of the driven shaft D will be a fraction of the difference between the speeds of the driving bevel gear and the control bevel gear. For example the form shown in Figure 7, the speed of the driven shaft D will be one-half the difference between the speeds of the driving bevel gear 70 and the control bevel gear 71.

It will be observed that with the forms of the invention illustrated in Figures 1, 6 and 7 it is possible to increase the horsepower delivered by the driven shaft D without in any manner varying the size or operation of the variable speed friction gearing.

Other modifications and changes in the details of structure of the mechanism will occur to those skilled in the art as within the spirit and scope of the invention.

What I claim is:

1. A variable speed gear comprising a driving shaft, a secondary shaft rotatable coaxially with and relatively to said driving shaft, a friction wheel on and rotatable with each said shaft and having a peripheral friction surface that varies in diameter axially of said shaft, a spindle, a non-rotatable mounting for said spindle telescopically slidable on and longitudinally of said driving shaft between said friction wheels, a bracket for said spindle pivotally connected to said mounting on an axis that is disposed transversely of the axis of said friction wheels so that said spindle may tilt in an axial plane of said friction wheels, a transmission disc rotatable on said spindle and frictionally contacting with said friction surfaces of said friction wheels so that said wheel on said secondary shaft is driven from the other wheel, and means for moving said mounting longitudinally of said axis of the friction wheels to vary the speed of rotation of said driven friction wheel.

2. The variable speed gear set forth in claim 1 wherein the last-named means comprises a trunnion on said mounting, a lever pivoted on a fixed support, and a lost-motion connection between said lever and said trunnion whereby swinging of said lever will move said mounting.

3. The variable speed gear set forth in claim 1 with the addition of means for driving one of said friction wheels, a driving bevel gear on said driving shaft rotatable with said one friction wheel, a control bevel gear on and rotatable by and with said secondary shaft and with the other friction wheel coaxially with and relatively to said driving bevel gear, a driven shaft, and a differential planetary bevel gear carried by said driven shaft and connecting said driving and said control bevel gears.

4. The variable speed gear set forth in claim 1 with the addition of means for driving one of said friction wheels, a driving bevel gear on said driving shaft rotatable with said one friction wheel, a control bevel gear on and rotatable by and with said secondary shaft and with the other friction wheel coaxially with and relatively to said driving bevel gear, a driven shaft, and a differential planetary bevel gear carried by said driven shaft and connecting with said driving and said control bevel gears, said driving bevel gear being of larger diameter than said control bevel gear.

5. The variable speed gear set forth in claim 1 with the addition of means for driving one of said friction wheels, a driving bevel gear on said driving shaft rotatable with said one friction wheel, a control bevel gear on and rotatable by and with said secondary shaft and with the other friction wheel coaxially with and relatively to said driving bevel gear, a driven shaft, said driving bevel gear being of larger diameter than said control bevel gear, a pair of spindles projecting laterally from said driven shaft, and two fast-connected bevel gears on each spindle, one meshing with said driving bevel gear and the other meshing with said control bevel gear.

6. A variable speed gear comprising a driving shaft, a driven shaft rotatable coaxially with and relatively to said driving shaft, a friction wheel on and rotatable with each said shaft and having a peripheral friction surface that varies in diameter axially of said shaft, a spindle, a non-rotatable mounting for said spindle telescopically slidable longitudinally of said driving shaft between said friction wheels, a bracket for said spindle pivotally connected to said mounting on an axis that is disposed transversely of the axis of said friction wheels so that said spindle may tilt in an axial plane of said friction wheels, a transmission disc rotatable on said spindle and frictionally contacting with said friction surfaces of said friction wheels so that said wheel on said driven shaft is driven from the other wheel, a trunnion projecting laterally from said mounting at each of two diametrically opposite sides of said shaft, guide blocks each connected to one of said trunnions and slidably mounted in a fixed support for reciprocating movement parallel to said shaft, and means for reciprocating said guide blocks whereby to adjust said transmission disc relative to said friction wheels.

7. A variable speed gear comprising two coaxially rotatable friction wheels the periphery of each of which has a friction surface that increases in diameter in a direction longitudinal of the axis of said wheels from the inner to the outer end of the wheel, a pair of spindles, a mounting for said spindles movable longitudinally of the axis of said friction wheels, said spindles being arranged on said mounting in angular relation to one plane and for tilting in another plane of the axis of said friction wheels, a transmission disc mounted on each spindle and having a friction surface in contact with the peripheral friction surfaces of said friction wheels, and means for moving said spindle mounting longitudinally of said axis of the friction wheels to vary the positions of the points of contact of said transmission discs with said friction wheels, said means comprising a lever pivoted on a fixed support, and a pin and slot connection between said lever and said spindle mounting whereby swinging of said lever will move said mounting.

WILLIAM EDLICH.